United States Patent

Young, Jr.

[15] 3,667,313
[45] June 6, 1972

[54] FLEXIBLE REMOTE CONTROL WITH SPACED BALL BEARINGS

[72] Inventor: Don L. Young, Jr., Hazelwood, Mo.

[73] Assignee: Controlex Corporation of America, Croton Falls, N.Y.

[22] Filed: Mar. 6, 1970

[21] Appl. No.: 17,191

[52] U.S. Cl. .........................................................74/501P
[51] Int. Cl. ..............................................................F16c 1/10
[58] Field of Search.............74/501 P, 501; 308/3.8, DIG. 7, 308/6 R, 6 B

[56] References Cited

UNITED STATES PATENTS

| | | | |
|---|---|---|---|
| 3,081,135 | 3/1963 | Olson | 308/195 |
| 3,362,249 | 1/1968 | Richoux | 74/501 |
| 3,212,834 | 10/1965 | Mayer et al. | 308/DIG. 7 |
| 3,429,197 | 2/1969 | Loewenstern | 74/501 P |
| 3,452,615 | 7/1969 | Gregory, Jr. | 74/501 |

Primary Examiner—Milton Kaufman
Attorney—Paul W. Garbo

[57] ABSTRACT

Flexible remote controls of the type in which at least one push-pull blade extends through a tubular sheath and is supported on its opposite sides by spaced balls are improved by replacing the usual metal ball-cage strips with lightweight, flexible plastic strips provided with perforations to hold the balls with the desired spacing.

2 Claims, 4 Drawing Figures

PATENTED JUN 6 1972        3,667,313

INVENTOR
DON L. YOUNG, JR.

BY *Paul W. Garbo*

AGENT

FLEXIBLE REMOTE CONTROL WITH SPACED BALL BEARINGS

BACKGROUND OF THE INVENTION

This invention relates to a tubular flexible remote control in which one or more push-pull blades are slidable lengthwise in the tubular sheath on spaced rolling elements disposed on opposite sides of each blade.

Illustrative of such a flexible remote control is that disclosed in U.S. Pat. No. 2,841,029 to Richoux in which the balls are spaced from one another by cage strips having openings to hold the individual balls. As shown by Richoux, each opening in the cage strip is provided with transverse walls having a height at least equal to the rolling radius of the ball so that the ball is free to rotate within the opening without risk of the ball escaping the opening. The special structure of the metal cage strip is clearly illustrated by FIGS. 4, 5 and 6 of the Richoux patent.

Metal ball-cage strips of the type disclosed by Richoux have long been used in flexible remote controls. However, these metal strips are relatively expensive to make, are comparatively heavy and suffer from the fact that their metal necessarily rubs with other metal elements of the control. It is evident in FIG. 4 of the Richoux patent that such rubbing contact exists between the metal ball-cage strip and the metal push-pull flat core. Over prolonged use of the remote control, such metal-to-metal rubbing leads to abrasion and gouging of the metal elements and possible ultimate jamming of the control.

Accordingly, the object of this invention is to provide an improved ball-cage strip for tubular flexible remote controls that overcomes the undesirable features of the metal ball-cage strips used heretofore.

SUMMARY OF THE INVENTION

In accordance with this invention, a simple strip of flexible plastic provided with perforations along the length thereof is used as the ball-cage strip in remote controls of the type wherein spaced ball bearings are disposed in contact with the opposite sides of each push-pull blade.

For a fuller understanding of the invention, reference is now made to the accompanying drawings.

DESCRIPTION OF PREFERRED EMBODIMENT

Figure 1:
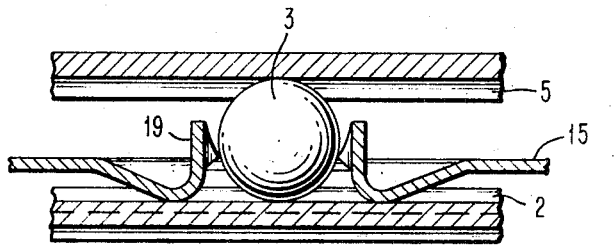
FIG. 1 is a partial cross-sectional view of a conventional remote control showing the push-pull flat core or blade, a ball-cage strip with a typical ball on one side thereof, and a rollway or ball guide aligned with the core.
Figure 2:
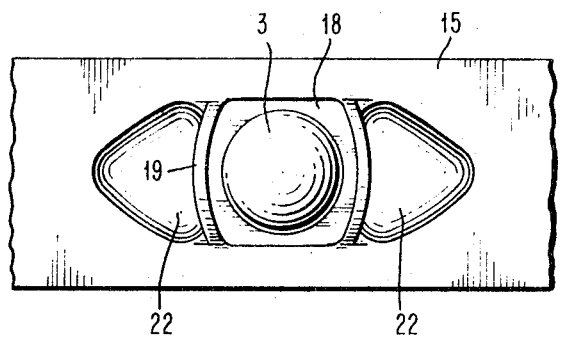
FIG. 2 is a top view of the ball-cage strip and ball of FIG. 1.
Figure 4:
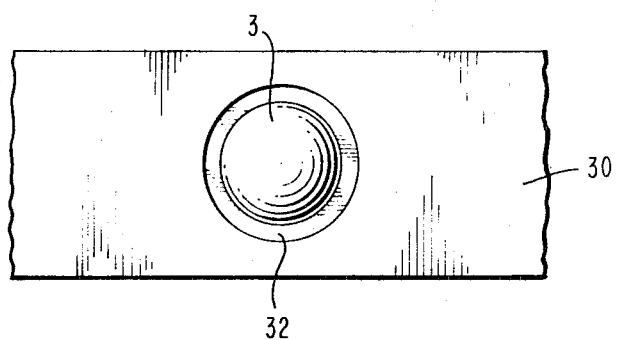
FIG. 4 is a top view of the ball-cage strip and ball of FIG. 3.

FIGS. 1 and 2 correspond to FIGS. 4 and 5 of U.S. Pat. No. 2,841,029 to Richoux and merely show that the central flat core or push-pull blade 2 has a typical ball 3 disposed between its upper face and rollway or ball guide 5. The conventional metal strip 15 used as ball-cage strip is provided with a series of regularly spaced openings 18 which are of a size greater than the diameter of ball 3 so as to permit each ball 3 to roll freely within each opening 18. To avoid escape of ball 3, opening 18 is bounded in the longitudinal direction by walls or flanges 19 oriented substantially at right angles to the plane of strip 15. Each flange 19 is formed by a turned-up edge of a dished portion 22 of metal strip 15 on each side of opening 18 in the longitudinal direction.

Figure 3:
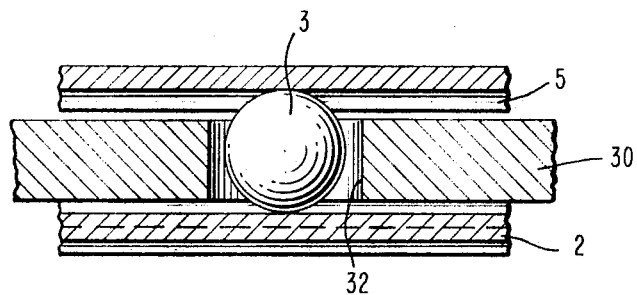
FIG. 3 is a partial cross-sectional view similar to FIG. 1 showing the remote control of this invention featuring a simple flexible plastic strip as the ball-cage strip.

FIGS. 3 and 4 show the preferred flexible plastic strip 30 of this invention with perforations 32 used as the ball-cage strip between central push-pull blade 2 and ball guide 5 to retain balls 3 spaced from one another. Perforation 32 is larger than ball 3 so that ball 3 is retained loosely therein and can roll freely within perforation 32 whenever blade 2 is moved longitudinally by a pushing or pulling force.

The simplicity of the ball-cage strip in the form of plastic strip 30 pursuant to this invention is clearly evident by contrast with the specially formed metal strip 15 of the prior art.

While any flexible plastic, which term includes resins, may be used in accordance with this invention, polyethylene and polypropylene offer the advantages of their wide availability, low price, good stability, light weight and waxlike surface which facilitates a metal element to slide thereon. Nylon is another type of flexible plastic or resin that is very suitable for ball-cage strips. The density of plastics is generally about one-eighth of the density of steel which is the metal commonly used in making the ball-cage strips of the prior art.

Particularly where the flexible remote control is exposed to heat, the ball-cage strip is preferably made of a fluorocarbon polymer such as tetrafluoroethylene polymer or fluorinated ethylenepropylene polymer which is very thermo-stable.

Besides the advantages of lower cost, lighter weight and avoidance of metal-to-metal rubbing with possible eventual jamming, the plastic ball-cage strip of this invention can be easily rolled up in tight spools so that handling, shipping and warehousing are facilitated and made more economical. It is not difficult to perceive that the special structure of the metal ball-cage strip of the prior art is prone to damage by bending of the flanges at each ball opening or by kinking of the metal strip especially at the sides of a ball opening. Even when great care is taken, such damage still occurs in normal manufacturing operations. The plastic ball-cage strip of this invention is entirely free of susceptibility to such damage.

To ensure against the escape of a ball from its perforation or opening in the plastic strip, the thickness of the plastic strip is made greater than the radius of the ball but less than its diameter so that the plastic strip is free to move longitudinally; a thickness in the range of about two-thirds to four-fifths of the diameter of the ball is generally preferred.

Those skilled in the art will visualize variations of the invention set forth hereinbefore without departing from its spirit and scope. For instance, the perforations or openings for holding balls in the plastic strips, shown as circular in FIG. 4, may be of square, rectangular, elliptical or other shape. Likewise, while a single push-pull blade is generally used in tubular flexible remote controls, two or more blades may be provided within a tubular remote control as disclosed in copending U.S. Pat. application Ser. No. 794,617, filed Jan. 28, 1969, now U.S. Pat. No. 3,552,218.

What is claimed is:

1. In a tubular flexible remote control for transmitting push and pull forces wherein at least one flexible blade is in contact with a row of spaced balls positioned in a groove on each of its opposite faces, the improvement of a ball-cage strip for each said row of balls made of flexible plastic selected from the group consisting of tetrafluoroethylene polymer and fluorinated ethylene-propylene polymer having a thickness greater than the radius but less than the diameter of said balls and provided with spaced perforations larger than said balls to retain said balls loosely so that each of said balls can roll freely within its perforation and said strip is free to move longitudinally in contact with said blade.

2. The remote control of claim 1 wherein the flexible plastic is tetrafluoroethylene polymer.

* * * * *